Figure 1:
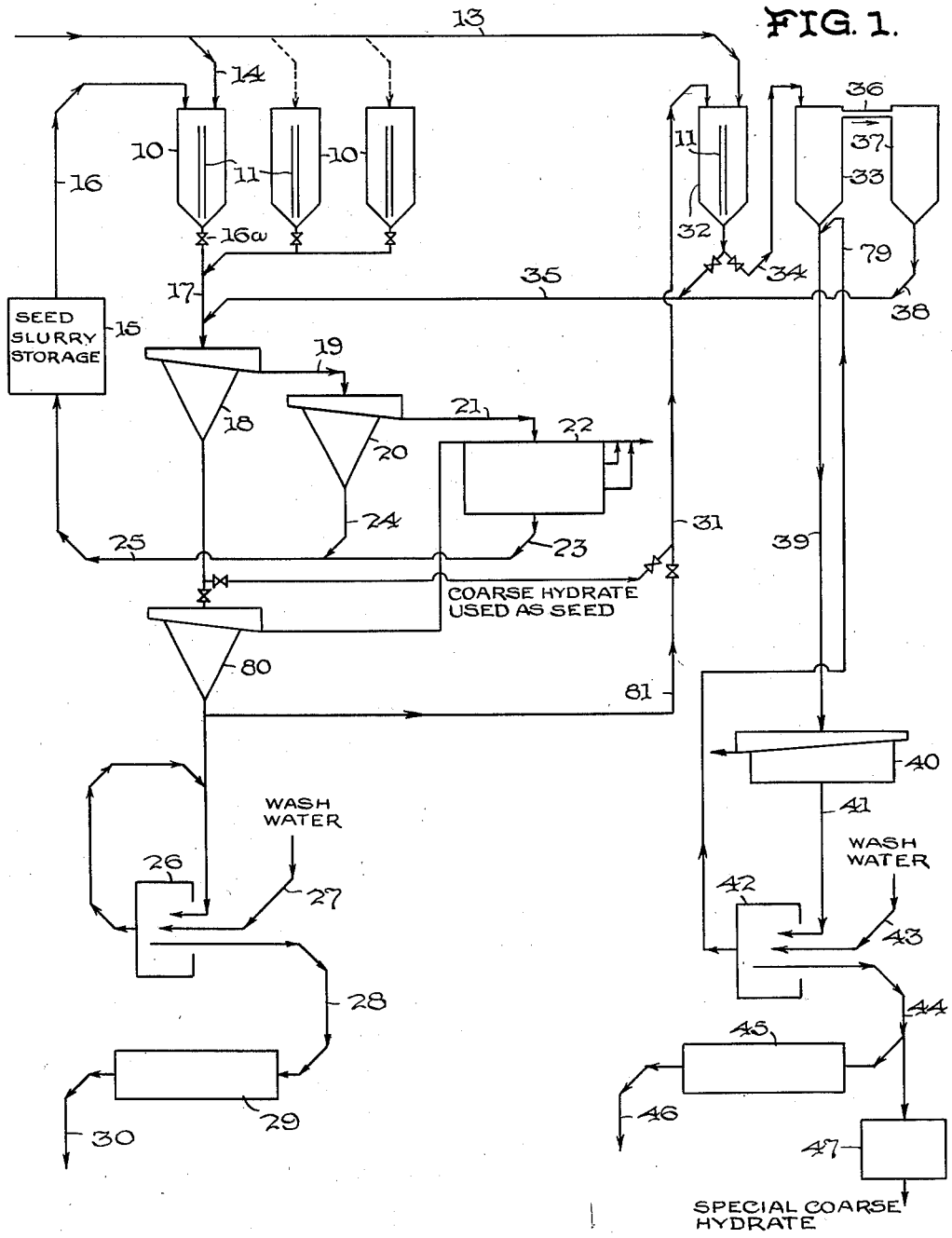

2,707,669

ALUMINA PRODUCTION

Jacques B. Houston and Hertis V. McGill, Baton Rouge, La., assignors to Kaiser Aluminum & Chemical Corporation, Oakland, Calif., a corporation of Delaware Application February 6, 1951, Serial No. 209,568

7 Claims. (Cl. 23—143)

The present invention relates to a process for the production of coarse-grained alumina hydrate from aluminate liquors. More particularly, the invention is directed to an improved process of precipitating and separating alumina hydrate particles from aqueous liquors supersaturated with alkali metal aluminate to produce a product of coarse-grained alumina hydrate having a particle size wherein not less than about 70% by weight is plus 200 mesh.

In the conventional methods of precipitating alumina hydrate from supersaturated solutions of alkali metal aluminate, the major portion of the precipitated hydrate particles are below 200 mesh in size and a substantial fraction is of minus 325 mesh. It is particularly desirable to increase insofar as possible the amount or fraction of plus 200 mesh particles in the hydrate product for use of the calcined material in the electrochemical reduction to aluminum. There are, in addition, other uses for alumina hydrate or calcined alumina, for example, in refractories, abrasives, and catalysts, wherein it is highly desirable to have substantially all of the particles larger than 200 mesh. In the past certain processes have been proposed for increasing the rate of precipitation and/or the particle size of alumina hydrate particles precipitated from alkali aluminate liquors. For the most part, all such processes have involved the recycling of fine alumina hydrate particles previously precipitated to act as seed for the treatment of further portions of liquor whereby particle growth is accomplished by deposition of hydrate from the liquor onto the seed acting as crystallization nuclei. Since the number of nuclei present per unit volume of liquor being treated directly affects the rate of deposition or crystallization of hydrate, the fine previously precipitated hydrate particles have been used as seed in order to obtain an optimum rate of precipitation. In some instances, relatively coarse hydrate particles have been reintroduced into a given body of partially exhausted aluminate liquor to induce further growth and promote the formation of particles of larger size. In such cases, however, the partially exhausted liquor also contains the fine hydrate particles which have been either retained or reintroduced into the body of partially exhausted liquor.

None of the prior art practices is productive of a preponderant or maximum amount of particularly coarse-grained hydrate particles from an alkali metal aluminate liquor. Upon precipitation of hydrate from a given body of aluminate liquor in the presence of seed crystals, the coarse particle fraction is produced during the initial precipitation stage from the strong or concentrated supersaturated aluminate liquor, particularly where the liquor is underseeded with respect to the degree of precipitation desired in a given time. As precipitation proceeds, and the solution becomes more exhausted with respect to dissolved alumina content, the precipitation of fine hydrate particles increases until the desired finishing ratio in the liquor, that is, the ratio of dissolved alumina-to-caustic soda concentration, is reached. This finishing ratio is always higher than the equilibrium ratio of alumina to caustic at the particular temperature of the precipitation operation, that is, generally speaking only about 50% of the alumina is precipitated from a given batch or body of aluminate liquor within the predetermined or selected time for precipitation. To attempt to induce the precipitation of any more of the remaining dissolved alumina content of the liquor would involve an uneconomical protraction of the precipitation time in the process. This unrecovered alumina, however, is not lost since the spent or exhausted liquor is recycled to the digestion phase of the process for treatment of further quantities of aluminous ore material. In any event, there can be only a limited production of coarse hydrate particles even allowing a maximum permissible time for growth, since the particles to be grown are too small in their initial form.

Accordingly, there is a need for a process of precipitation and separation of alumina hydrate particles from alkali metal aluminate liquors which will produce substantial or predominant amounts of especially coarse-grained alumina to satisfy the demand particularly for uses other than in the aluminum reduction field. More specifically, the alumina industry is presented with the problem of obtaining alumina hydrate in particulate form wherein substantially all, that is, not less than about 70% of the hydrate particles are plus 200 mesh in size. The present invention is directed to a process for the production of such an alumina hydrate or calcined alumina product.

It is, therefore, a primary object and purpose of the invention to provide an improved process for the production of coarse-grained alumina hydrate particles by control of the precipitation of the alumina hydrate particles utilizing successive portions of fresh aluminate solution seeded by coarse particles only from a preceding precipitation whereby successive growth of particle size is accomplished while at the same time consolidation of the mass of particulate hydrate is prevented. It is a further object of the invention to provide a method of precipitation and separation of alumina hydrate particles from aluminate liquors wherein the especially coarse-grained alumina produced is separated from the relatively fine hydrate particles and the latter in slurry form are concentrated with or without classification and utilized in the precipitation of hydrate from a portion of fresh aluminate liquor to be initially treated. Another object of the invention is generally to carry on the precipitation of alumina hydrate particles from aluminate solutions in a simple and efficient manner, to successively increase the coarse hydrate particle size and to thereby obtain a high yield of particularly coarse alumina hydrate.

A specific object of the invention is to provide a process involving means for obtaining the coarse hydrate in a high solids content slurry and maintaining or re-establishing such high solids content slurry for additional subsequent particle growth steps in successive portions of fresh liquor and/or ultimate filtration and calcination of the coarse hydrate.

Another object of the invention is to provide a process for the preparation of coarse-grained alumina hydrate particles involving a succession of pairs of steps or cycles of (1) precipitation of hydrate including seed particle growth followed by (2) hydrate particle separation whereby enlarged coarse particle fractions of increasing size are successively produced and used for seeding successive portions of fresh aluminate liquor until particles of the desired size result from the final precipitation and separation step or cycle.

According to the invention, it was discovered that a substantial or predominant amount of coarse-grained alumina hydrate could be precipitated from supersaturated aluminate liquors by conducting the precipitation on a fresh portion of such liquor in the presence of coarse particles of previously precipitated and classified hydrate from an initially treated portion of fresh aluminate liquor while agitating the mixture or slurry to promote further growth of the coarse seed particles, and thereafter separating the relatively fine particles precipitated from the aluminate liquor from the enlarged coarser particles formed by the growth of the coarse seed particles. Accordingly, in its simplest embodiment, the invention contemplates the precipitation of hydrate from at least two different portions of fresh aluminate liquor successively with intermediate separation of the initially precipitated hydrate into a coarse and a fine fraction, and the utilization of the coarse fraction in the precipitation of hydrate from the succeeding portion of fresh liquor, followed by separation of the enlarged coarser particles from the second treated portion of aluminate liquor from the relatively fine particles of hydrate formed in such body of liquor.

Otherwise stated, the invention essentially comprises the production of coarse hydrate particles in a succession of pairs of steps, constituting a precipitation and separation cycle, performed successively on separate bodies of fresh or concentrated supersaturated aluminate liquor, in which each pair of steps involves (1) a seed particle growth step wherein the coarse hydrate fraction derived from the preceding precipitation and separation cycle is introduced as seed into the succeeding portion of fresh liquor whereby such coarse seed particles are progressively enlarged by growth while the slurry is agitated, and (2) thereafter separating such enlarged coarser particles from the relatively fine particles produced during the given precipitation and separation cycle, and utilizing the progressively enlarged coarse particles as seed in the next succeeeding precipitation and separation cycle on another portion of fresh concentrated aluminate liquor.

Accordingly, the process of the invention may involve two or more precipitation and separation cycles performed in series on successive portions of fresh liquor. The invention is eminently suitable for use in conjunction with the conventional precipitation operations for making ordinary reduction grade alumina, or is also adaptable to an alumina plant wherein the entire production is devoted to the manufacture of the particularly coarse-grained alumina of the invention.

Figure 2:
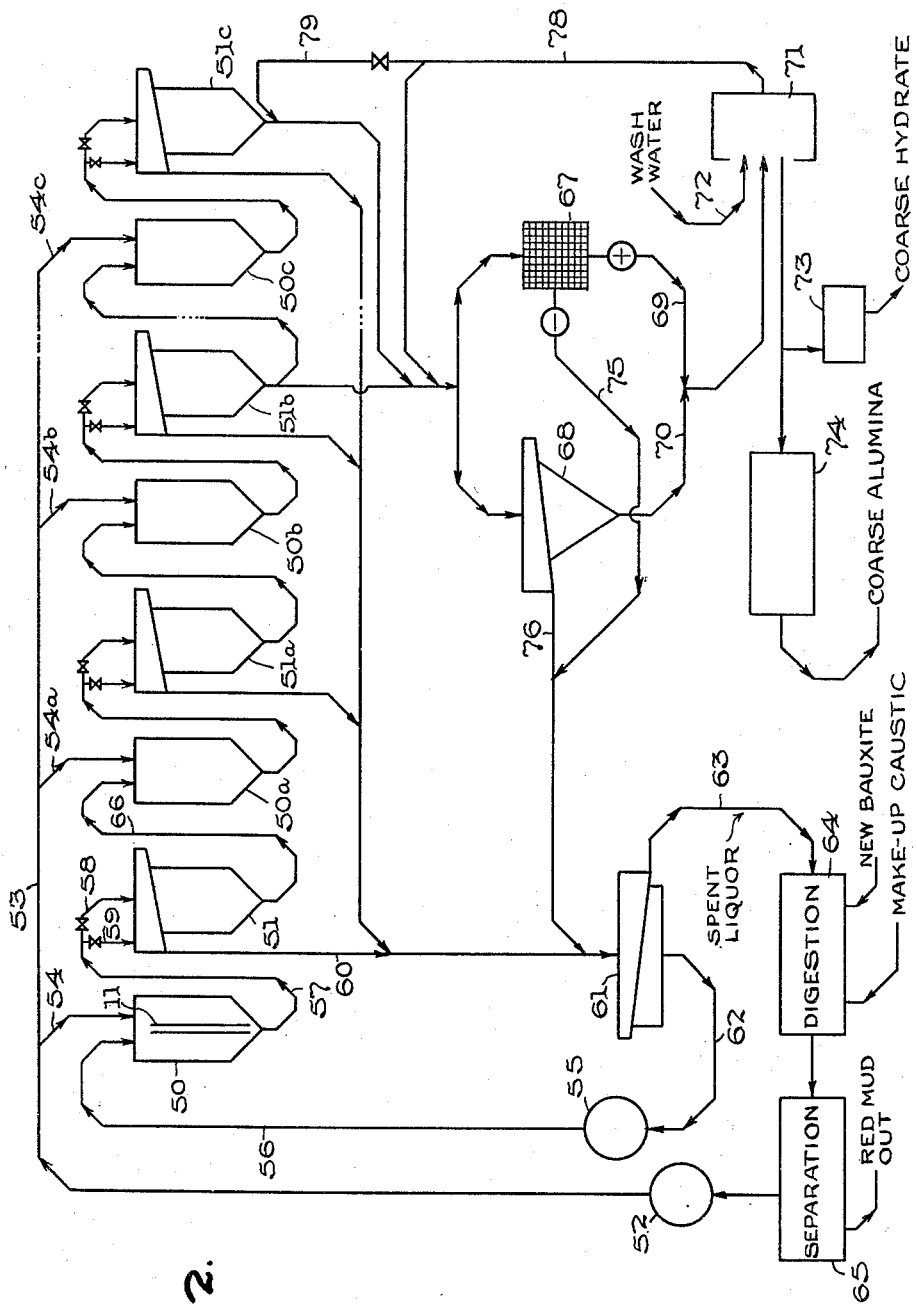

The invention in its generic and specific embodiments is described in greater detail with reference to the drawings wherein:

Figure 1 represents a flowsheet or diagrammatic view illustrating the process of the invention as utilized in conjunction with the precipitation department of an alumina plant producing ordinary reduction grade alumina hydrate; and Figure 2 represents a flowsheet or diagrammatic view of the method of the invention applied to a plant in which the entire production is devoted to the manufacture of especially coarse-grained alumina of the invention.

Referring now to Figure 1, the usual precipitation tanks 10, provided with conventional air lifts 11, are sequentially filled with fresh supersaturated aluminate liquor from supply line 13 through feed lines 14.

Hydrate precipitation is conducted in a semi-continuous manner in the respective precipitation tanks at spaced intervals by the introduction of relatively fine seed slurry from the storage tank 15 through the seed slurry supply line 16, while the contents of tank 10 are agitated by means of the conventional air lift. Precipitation in tank 10 of hydrate particles is allowed to progress until the liquor attains the desired finishing ratio, that is, the desired ratio of residual dissolved alumina-to-caustic concentration in the liquor. The hydrate slurry is then emptied through the bottom of tank 10 by means of valve 16-a and is passed through line 17 to a primary cone classifier 18 which separates the hydrate into a fine particle overflow slurry and a coarse-grained underflow slurry. The fine hydrate slurry is passed through line 19 to a secondary cone classifier 20 where it is further divided into a low solids fine hydrate fraction as overflow and another fraction, containing larger particles, as underflow. The overflow of fine hydrate is passed through line 21 to a thickener 22 for concentration after which it is combined through line 23 with the secondary cone classifier underflow passing through line 24. The combined slurry fractions are then passed through line 25 to the seed slurry storage tank 15 for use as seed in repeating the initial precipitation cycle on another fresh liquor batch.

The coarse hydrate underflow from the primary cone classifier 18 in conventional practice is all passed to a primary washing cone 80 where further classifying occurs and then through suitable other washing apparatus not shown in the drawings to the filters 26 where it receives further water wash through line 27 before the cake is discharged from the filter and conveyed at 28 to the conventional calcining kiln and cooling apparatus indicated at 29 for the production of ordinary reduction grade alumina indicated at 30.

In performing the process of the invention, however, a selected portion of the coarse hydrate underflow from the primary cone classifier 18 is taken off through line 31 for introduction into precipitation tank 32 which is filled with fresh aluminate liquor. Thus, the coarse hydrate fraction from the previously precipitated and classified hydrate is utilized as seed in precipitating hydrate from the portion of fresh liquor contained in tank 32 in the substantial absence of fine hydrate. The contents of tank 32 are agitated by the conventional air lift 11.

In an alternative embodiment of the invention, as shown in Figure 1, particularly advantageous where the coarse hydrate from the primary cone classifier 18 is not sufficiently coarse to constitute the optimum size for seeding the fresh green liquor in tank 32, coarse hydrate underflow from the primary washing cone 80 may be utilized. This slurry, when employed, is fed to tank 32 through line 81. The underflow from cone 80 is relatively coarser, that is, contains fewer fine hydrate particles due to the removal of the finer fraction in the washing cone as overflow slurry.

In connection with the amount of course hydrate utilized as seed for precipitation in tank 32, it is a particular feature of the invention, when operating as illustrated in Figure 1, to use such an amount that the finishing ratio obtained at the end of a predetermined time of precipitation (that is, the alumina-to-caustic ratio in the partially exhausted liquor) is slightly higher than the conventional or normal finishing ratio obtained during precipitation over the same time period, for example, as in the initial precipitation cycle conducted in tank 10. In other words, the aluminate liquor in tank 32 is what is known in the art as slightly underseeded. The term "alumina to caustic ratio," as used herein, is defined in its usual and accepted meaning as a weight ratio wherein the caustic soda is expressed as sodium carbonate equivalent. (See "Extractive Metallurgy of Aluminum," R. S. Sherwin, Transactions A. I. M. E., vol. 188, April 1950, Journal of Metals, pp. 661–667, 664.) This manner of operation has been found to result in the precipitation of predominantly coarse-grained particles with a minimum production of fine hydrate particles and promotes the maximum growth of the coarse seed particles introduced into the body of aluminate liquor. In conventional practice the normal A/C ratio of the spent liquor is about 0.35, and thus the coarse particle seed is used in an amount to produce a finishing A/C ratio of about 0.400 in the preferred embodiment within the selected or prescribed time for precipitation.

Particle growth by deposition of precipitated hydrate on the coarse seed particles and precipitation of relatively fine hydrate particles occur as the contents of tank 32 are agitated gently by action of the air lift. When decomposition of the aluminate liquor and precipitation of hydrate has reached a satisfactory degree of completion as indicated by the attainment of the desired finishing ratio in the treated liquor, agitation of the slurry is stopped by discontinuing air lift operation and natural classification is allowed to begin. About half of the slurry in tank 32, containing the largest and fastest settling particles of hydrate, is pumped through line 34 into a quiescent settling zone provided in tank 33. This fraction of the hydrate slurry contains substantially all of the enlarged coarser particles formed by coarse seed particle growth with a minimum of relatively fine hydrate particles. The balance of the slurry in tank 32, containing practically no coarse hydrate particles but a substantial fraction of the relatively fine hydrate particles, is separately taken off through line 35 for retreatment in primary cone classifier 18 and the subsequent classification and thickening apparatus indicated in the flowsheet for utilization along with the fine hydrate fraction from precipitator 10 as seed for new batches of initially treated liquor introduced into precipitation tank 10. In addition, any coarse hydrate passing through line 35 with the fine hydrate to the primary cone classifier 18 may be recovered in the primary cone classifier underflow and reused as coarse particle seed on another batch of fresh liquor introduced into tank 32.

Tank 33 operates essentially as a settling tank and provides a quiescent pool of liquor from which the enlarged coarser hydrate particles settle out, while finer hydrate slurry is discharged as overflow through line 36 to holding tank 37 for recycling through lines 38 and 35 to the primary cone classifier 18. Tank 33 also provides a zone for accumulating the enlarged settled coarser hydrate particles produced from several batches of fresh liquor introduced into tank 32.

The hydrate slurry of coarse particles is discharged from tank 33 through line 39 and, if desired, may be passed into an elutriator 40 for another concentrating and settling operation for further removal of fine hydrate particles which may be returned to any appropriate part of the main plant. The elutriator underflow 41 consisting substantially solely of enlarged coarser hydrate particles is passed through filter 42 where it is washed with water introduced through line 43 before discharge on conveyor 44 as cake and introduction into a drier 47 for hydrate production or a conventional calcining kiln and cooling apparatus indicated at 45 for calcined alumina production. The especially coarse-grained alumina product 46 in a typical operation contains not less than about 70% of particles which are plus 200 mesh in size.

Now referring to Figure 2, the invention is illustrated with reference to application thereof to a plant in which the entire production is devoted to the manufacture of the particularly coarse-grained alumina hydrate. A series of pairs of precipitation and quiescent zone settling tanks 50 and 51, 50A and 51A, 50B and 51B, 50C and 51C, are provided for the precipitation of hydrate from successive portions of fresh aluminate liquor in series, the respective precipitation tanks being filled from the rich liquor storage tank 52 through supply line 53 and feed lines 54, 54A, 54B, and 54C. The fresh aluminate liquor portion in tank 50 is first treated to precipitate hydrate by seeding with relatively fine hydrate particles from seed storage or stock tank 55 fed into tank 50 through line 56. The operation during the precipitation in tank 50 is substantially the same as that described in connection with the description of Figure 1, and the air lift 11 is operated to provide agitation during particle growth. In the embodiment represented in Figure 2, the coarse hydrate particles formed in the initial precipitation cycle occurring in tank 50 may not be sufficiently large to settle into the lower half of the slurry immediately after the air lift operation is discontinued. Accordingly, at the end of the precipitation period, a time interval for settling or stratification of the contents of tank 50 into a lower coarse particle fraction and an upper fine hydrate fraction slurry is permitted before the contents of tank 50 are discharged through line 57. After such settling period, that portion of the hydrate slurry of tank 50 constituting the coarse particle slurry is passed through line 58 into the quiescent settling zone tank 51, and the remaining fine hydrate slurry portion of the contents of tank 50 is passed through line 59 to the overflow of settling tank 51 where it is discharged along with fine hydrate slurry overflow from tank 51 into line 60, and is concentrated in thickener 61 for recycle as concentrated fine hydrate seed slurry through line 62 to seed storage or stock tank 55. The spent liquor overflow from thickener 61 is passed through line 63 to the digestion phase of the alumina production plant indicated at 64. The pregnant liquor or fresh concentrated aluminate liquor from the digestion phase is passed to the separation and clarification phase of the process indicated at 65 from which the clarified strong aluminate liquor is sent to rich liquor storage 52.

The coarse particle fraction which settles in tank 51 is introduced through line 66 into the next succeeding portion of fresh liquor from which hydrate is to be precipitated in tank 50A. This coarse hydrate particle fraction progressively grows in size due to deposition of alumina hydrate on the coarse particles and the cycle of operations is continued through the series of successive precipitation and separation cycles with the coarse particle fraction from each preceding precipitation and separation cycle constituting a larger and larger coarse particle seed for the next succeeding precipitation on the next batch of fresh aluminate liquor. Thus, the cycle of precipitation and separation of alumina hydrate on successive portions of fresh liquor with the coarse hydrate fraction from the preceding precipitation and separation constituting the seed for the next succeeding cycle is repeated until the coarse hydrate fraction product has reached the desired size, for example, at least 70% by weight plus 200 mesh.

The relatively fine hydrate particle fractions from the succeeding precipitator tanks 50A, 50B and 50C are combined with the fine hydrate particle overflow slurry from the quiescent settling zone tanks 51A, 51B and 51C, respectively. These combined fine hydrate slurries, like the fine hydrate slurry from line 60, are sent to the thickener 61 for incorporation in the concentrated seed slurry sent to seed storage 55.

The final coarsest particle hydrate slurry discharged from settling zone tank 51C may be subjected to wet screening as indicated at 67, or hydraulic classification as indicated at 68, to remove residual fine hydrate particles associated therewith. In either case, the slurry consisting substantially solely of coarse hydrate particles of the desired size is passed through line 69 or 70 to the filter 71 where it is washed with water provided through line 72 and the cake is conveyed to a conventional drier 73 for hydrate production or to a calcining kiln and cooling apparatus 74 for calcined alumina production depending upon customer requirements.

The major portion of the spent liquor from the coarse hydrate slurry, together with any residual fine hydrate, is passed from the wet screen 67 through lines 75 and 76, or through line 76 from the classifier overflow to thickener 61 where it is incorporated with the concentrated fine hydrate slurry to seed storage tank 55.

The coarse alumina produced as indicated at 77 contains particles substantially all of which, that is, not less than about 70%, are above a predetermined desired size, for example, plus 200 mesh.

Utilization of the precipitation tanks to classify the hydrate slurry produced is a highly advantageous feature of the invention. As indicated in connection with the description of Figure 1, classification begins immediately after air lift operation is discontinued, and the settling rate of the coarse particles is sufficiently fast to begin transferring coarse slurry into the settling zone without a holding period. Otherwise, the stratification or classification may be conducted as described in connection with the operation of tank 50 of Figure 2, wherein the air lift is discontinued and settling occurs in the quiescent liquor before the slurry is discharged. Such utilization of the precipitation tank to classify the hydrate greatly reduces the amount of fines to be removed in subsequent treatment and permits more efficient separation in the settling zone.

In regard to the finishing ratio, that is, the alumina-to-caustic concentration in the treated liquor in any given portion thereof, the precipitation is always allowed to proceed to a point at which the alumina concentration will be sufficiently low so that the coarse hydrate particles suspended in the liquor can be settled in the quiescent settling zone substantially without danger of being consolidated by further precipitation of hydrate from the liquor. In other words, the finishing ratio is such that the partially exhausted liquor without agitation will not be productive of further hydrate crystals. At such a point, the liquor may be said to be stable in the absence of agitation, although the finishing ratio is slightly higher than the equilibrium ratio of alumina to caustic for the liquor at the particular temperature of precipitation. In any event, the finishing ratio selected will effectively prevent consolidation of the precipitated particulate mass of hydrate during settling.

In actual practice, the division of the contents of the precipitator tanks into a coarse particle fraction and a fine hydrate fraction by pumping off separately may be easily accomplished while avoiding introduction of a portion of the fine hydrate slurry into the settling zone with the coarse hydrate slurry, or introduction of any of the coarse hydrate slurry with the fine hydrate slurry recycled to the initial precipitation stage. The fractional part of the contents of a given precipitator tank that is pumped into the settling zone increases with (1) the rate of pumping and (2) the fineness of the enlarged coarser particles. Accordingly, it is advantageous to hold the pumping rate at approximately a constant figure, depending entirely upon the bulk of the precipitate slurry or the capacity of the tank, and to vary the time of pumping into the quiescent settling zone in accordance with a screen test on the finished hydrate in the precipitation tank. In a particular instance, the pumping rate has been held at about 2500 gallons per minute, at which rate about 40 minutes of pumping was sufficient to transfer the coarse fraction to the settling zone without substantial contamination with the fine hydrate fraction. The fine hydrate fraction, as indicated above, was then pumped separately back to the initial precipitation stage for classification and/or concentration.

A particularly significant specific feature of the process of the invention resides in the manner of discharging the contents of the settling zones, that is, the enlarged coarser hydrate slurry. After accumulation of sufficient settled enlarged coarser particles in the quiescent settling zone, the slurry is discharged through the conical bottom of the settling zone by water injection with a minimum of agitation, so that the slurry can be discharged at its attained solids content of about 50%, rather than by discharging the mass by stirring the slurry to fluidity by use of the air lift, in which case it is thinned to a solids content of from about 30 to 35%. In utilizing this procedure, the slurry is continuously discharged until the solids content decreases, that is, until the slurry begins to thin out.

The foregoing discharge procedure provides the following advantages:

1. In the two-cycle process, as illustrated by Figure 1, where no further growth of particles is required, the procedure gives a conveniently thick slurry of about 50% solids for treatment in the elutriator and/or filter. In such a case, an additional advantage is attained by the use of filtrate discharged from filter 42 or plain water, for example, condensate, for the liquid injection discharge of the slurry, since this aids in washing out soda from the hydrate particles and makes for a purer product.

2. In the step-wise procedure involving a plurality of precipitation and separation cycles, that is, where additional particle growth steps are required, the procedure of discharge produces a slurry containing less spent liquor to dilute the fresh portion of strong aluminate liquor into which the enlarged coarser particle slurry is introduced in the following precipitation and growth step. In addition, here also the use of either filtrate, as indicated at 78 in Figure 2, or plain water, such as condensate, rather than spent liquor is advantageous in maintaining a high alumina-to-caustic ratio at the beginning of the following growth step. These conditions, of course, are highly advantageous for particle growth, and involve that portion of the invention wherein the particle growth steps are conducted in successive portions of fresh liquor as opposed to successive portions of liquor varying from fresh to substantially exhausted.

The apparatus for performing the liquid injection discharge of the enlarged coarser particle slurry from the settling zone tank 33 of Figure 1 and the settling zone tanks 51, 51A, 51B and 51C of Figure 2 is illustrated in both drawings at 79 wherein filtrate liquor from filters 42 and 72, respectively, is introduced at the outlet of the conical bottom settling tanks.

The process of the invention has been described in detail with reference to the particular applications illustrated in Figures 1 and 2, but it is to be understood that the invention is not specifically limited thereto, the scope of the invention being defined by the claims appended hereto, which invention in its generic sense embraces essentially the production of particularly coarse hydrate particles from aluminate liquors by the utilization of coarse particle fractions from previous precipitated and classified hydrate in the seeding of additional portions of fresh aluminate liquor, whereby the coarse particle seed fraction is subjected to a particle growth step or steps followed by separation of the enlarged coarser particles from the relatively fine hydrate particles simultaneously produced.

Various modifications of the particular steps of concentration and classification of slurries may be employed without departing from the spirit of the invention, and furthermore the invention is not limited except in its specific aspects to the specific manner or apparatus employed in the performance thereof.

We claim:

1. A process for producing coarse-grained alumina hydrate from supersaturated aluminate solutions which comprises the steps of successive precipitation of hydrate from a plurality of portions of fresh previously untreated supersaturated aluminate liquor wherein the hydrate precipitated from each portion is separated into a fine fraction and a coarse fraction, and the coarse hydrate fraction only derived from each preceding portion of treated liquor is introduced as seed into the succeeding portion of fresh previously untreated liquor in the substantial abscence of precipitated fine hydrate whereby the coarse seed particles are progressively enlarged by growth to the desired coarse particulate size.

2. A process for the production of coarse-grained alumina hydrate having at least 70% by weight of particles plus 200 mesh, which comprises precipitating alumina hydrate from a portion of fresh supersaturated aluminate liquor in the presence of coarse particles of previously precipitated and classified hydrate from an initially treated portion of fresh liquor as seed and in the substantial absence of precipitated fine hydrate, the amount of said coarse hydrate added as seed being such that the alumina-to-caustic weight ratio of the liquor attained at the end of a selected precipitation time is in excess of about .350 and up to about .400, maintaining the coarse particles in suspension in the mixture by agitation to promote precipitation and further growth of the coarse seed particles, classifying the hydrate particles produced by discontinuing agitation of the slurry and permitting the coarse and fine hydrate particles to stratify by settling, separating a slurry of enlarged coarser particles from the relatively fine hydrate particles by transfer of the former to a quiescent zone for further settling, further separating and removing additional fine hydrate as overflow in the quiescent settling zone, and recovering a concentrated slurry of enlarged coarser particles.

3. A process according to claim 2 in which the amount of coarse hydrate particles from the previous hydrate precipitation added to the fresh liquor as seed is such that the finishing ratio in the liquor after a predetermined precipitation time will permit substantially no further hydrate precipation in the quiescent zone during settling thereby preventing consolidation of the mass of particulate hydrate.

4. A process for the production of coarse grained alumina hydrate particles which comprises precipitating alumina hydrate from a batch of fresh previously untreated supersaturated aluminate liquor by seeding with coarse particles only of previously precipitated and classified hydrate from an initially treated batch of fresh liquor and in the substantial absence of previously precipitated fine hydrate, agitating the mixture to promote further growth of the coarse seed particles in the precipitation zone, separately removing from the precipitation zone the enlarged coarser hydrate particles formed by growth of the coarse seed particles and the relatively fine hydrate particles precipitated from the fresh batch of liquor, and thereafter substantially removing residual fine hydrate particles from the separately removed enlarged coarser hydrate particle slurry.

5. A process for producing particularly coarse grained alumina hydrate particles which comprises initially precipitating alumina hydrate from a first portion of fresh supersaturated aluminate liquor in the presence of fine hydrate as seed, classifying the precipitated hydrate from the first portion of liquor into fine particle and coarse particle fractions, adding to a second portion of fresh supersaturated aluminate liquor in a different precipitation zone the coarse hydrate particle fraction only in the substantial absence of precipitated fine hydrate, agitating to promote growth on the coarse hydrate seed particles with formation of additional relatively fine hydrate particles, the amount of coarse particle fraction added to the second portion of fresh liquor being limited to obtain an alumina to caustic weight ratio slightly higher than that obtained in the treatment of the first portion of liquor over the same precipitation time period, separately removing a slurry of predominately enlarged coarse hydrate particles from the precipitation zone, and thereafter removing the residual fine hydrate particles from the coarse particle slurry in a quiescent settling zone.

6. A process according to claim 5 in which the amount of coarse hydrate particle fraction added to the second portion of fresh aluminate liquor as seed is such that the finishing alumina to caustic ratio of the liquor upon removal of the enlarged coarse hydrate particle slurry will not permit any substantial further hydrate precipitation in the quiescent settling zone thereby preventing consolidation of the mass of coarse particulate hydrate.

7. A process according to claim 5 wherein the successive steps of precipitation and separation are repeated on two different portions of fresh aluminate liquor and the fine hydrate slurries from the preceding precipitation and separation steps are combined, concentrated and recycled for use as seed in the precipitation of hydrate from a first portion of fresh liquor to be treated upon such repetition of the precipitation and separation cycles.

References Cited in the file of this patent

UNITED STATES PATENTS

| Number | Name | Date |
| --- | --- | --- |
| Re. 13,668 | Fickes | Jan. 6, 1914 |
| 1,314,710 | Sherwin | Sept. 2, 1919 |
| 1,943,786 | Cowles | Jan. 16, 1934 |
| 2,204,180 | Gerlach | June 11, 1940 |
| 2,219,776 | Henderson | Oct. 29, 1940 |
| 2,569,357 | Vahl | Sept. 25, 1951 |
| 2,606,820 | Harms | Aug. 12, 1952 |

FOREIGN PATENTS

| Number | Country | Date |
| --- | --- | --- |
| 506,885 | Great Britain | Oct. 11, 1938 |